(12) United States Patent
Nabata et al.

(10) Patent No.: US 9,392,371 B2
(45) Date of Patent: Jul. 12, 2016

(54) ELECTRONIC DEVICE

(71) Applicant: KYOCERA CORPORATION, Kyoto (JP)

(72) Inventors: Toshihisa Nabata, Kanagawa (JP); Satoshi Mizuta, Kanagawa (JP); Tomoaki Miyano, Mie (JP); Kiyokazu Sato, Kanagawa (JP); Akio Kihara, Kanagawa (JP); Shun Kazama, Kanagawa (JP); Yasuhiro Katayama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/374,646

(22) PCT Filed: Apr. 12, 2013

(86) PCT No.: PCT/JP2013/002526
§ 371 (c)(1),
(2) Date: Jul. 25, 2014

(87) PCT Pub. No.: WO2013/153827
PCT Pub. Date: Oct. 17, 2013

(65) Prior Publication Data
US 2015/0030189 A1 Jan. 29, 2015

(30) Foreign Application Priority Data

Apr. 12, 2012 (JP) .................. 2012-091118

(51) Int. Cl.
*H04R 25/00* (2006.01)
*H04R 17/00* (2006.01)
(Continued)

(52) U.S. Cl.
CPC ............... *H04R 17/00* (2013.01); *G09F 21/04* (2013.01); *G10K 11/175* (2013.01);
(Continued)

(58) Field of Classification Search
CPC . H04R 25/606; H04R 2460/13; G10K 11/178
See application file for complete search history.

(56) References Cited

U.S. PATENT DOCUMENTS 6,463,157 B1 * 10/2002 May ................. H04R 1/083
310/324
8,918,149 B2 * 12/2014 Hosoi ................. H04M 1/0202
455/550.1

(Continued)

FOREIGN PATENT DOCUMENTS

JP   H08-223264 A   8/1996
JP   2004-187031 A   7/2004
(Continued)

OTHER PUBLICATIONS

International Search Report; PCT/JP2013/002526; Jun. 11, 2013.
(Continued)

*Primary Examiner* — Curtis Kuntz
*Assistant Examiner* — Ryan Robinson
(74) *Attorney, Agent, or Firm* — Studebaker & Brackett PC

(57) ABSTRACT

The content of sound leakage from a vibrating plate that vibrates due to a piezoelectric element is made difficult to recognize. An electronic device (1) according to the present invention includes a piezoelectric element (30) and a vibrating plate (10) that vibrates due to the piezoelectric element (30), the electronic device (1) causing the vibrating plate (10) to generate air-conducted sound and vibration sound that is transmitted by vibrating a part of a human body. The electronic device (1) also includes an air-conducted sound reducing unit that makes a portion or all of the air-conducted sound difficult to hear.

10 Claims, 7 Drawing Sheets

(51) Int. Cl.
*G10K 11/178* (2006.01)
*H04M 1/03* (2006.01)
*H04R 7/04* (2006.01)
*G09F 21/04* (2006.01)
*G10K 11/175* (2006.01)

(52) U.S. Cl.
CPC ............ *G10K 11/178* (2013.01); *H04M 1/03* (2013.01); *H04R 7/045* (2013.01); *G10K 2210/1081* (2013.01); *H04R 2400/03* (2013.01); *H04R 2460/01* (2013.01); *H04R 2460/13* (2013.01); *H04R 2499/11* (2013.01); *H04R 2499/15* (2013.01)

(56) References Cited

U.S. PATENT DOCUMENTS

| | | | | |
|---|---|---|---|---|
| 2005/0065778 | A1* | 3/2005 | Mastrianni | G10K 11/175 704/200.1 |
| 2007/0010283 | A1* | 1/2007 | Kim | G10K 11/1788 455/550.1 |
| 2007/0055513 | A1* | 3/2007 | Hwang | 704/233 |
| 2010/0225600 | A1* | 9/2010 | Dai | G06F 3/016 345/173 |
| 2012/0244917 | A1* | 9/2012 | Hosoi | G02C 11/06 455/575.1 |

FOREIGN PATENT DOCUMENTS

| | | |
|---|---|---|
| JP | 2005-348193 A | 12/2005 |
| JP | 2007-082009 A | 3/2007 |
| JP | 2008-134557 A | 6/2008 |
| WO | WO 2008133490 A2 * | 11/2008 |

OTHER PUBLICATIONS

Written Opinion of the International Searching Authority with concise explanation; PCT/JP2013/002526; Jun. 11, 2013.

* cited by examiner

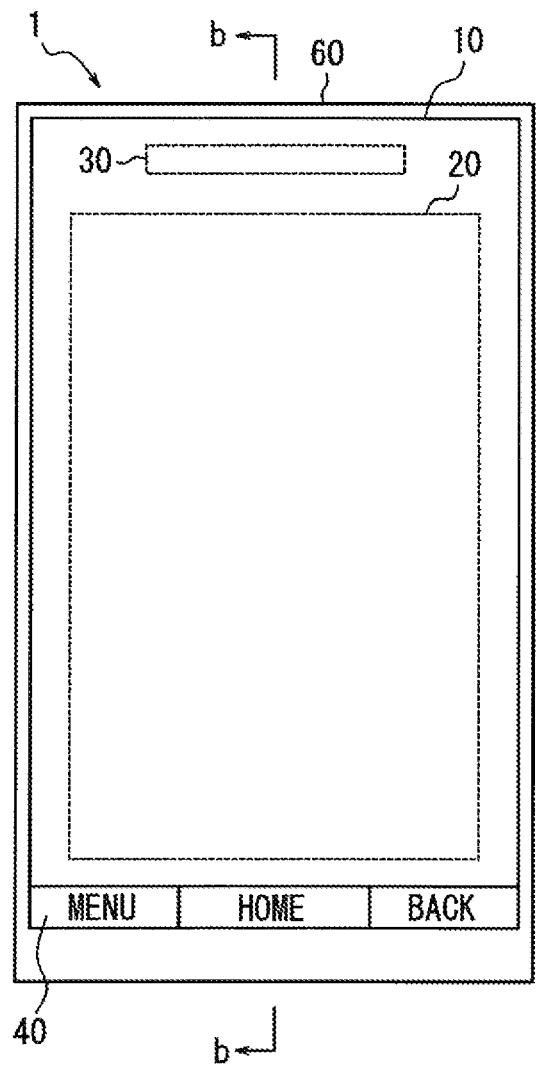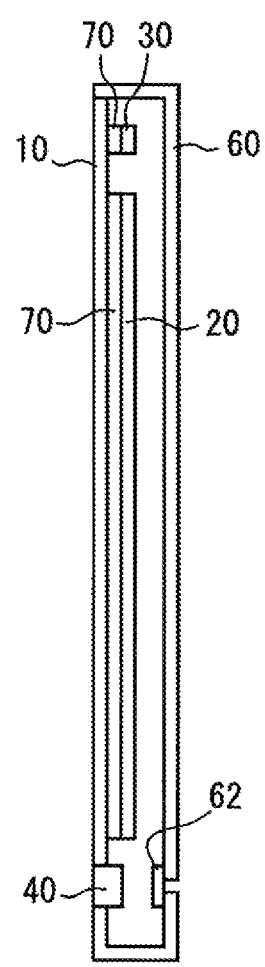

ELECTRONIC DEVICE

CROSS-REFERENCE TO RELATED APPLICATION

This application claims priority to and the benefit of Japanese Patent Application No. 2012-091118 filed Apr. 12, 2012, the entire contents of which are incorporated herein by reference.

TECHNICAL FIELD

The present invention relates to an electronic device that vibrates a panel by applying a predetermined electric signal (audio signal) to a piezoelectric element and that transmits air-conducted sound and human body vibration sound to a user by transmitting the vibration of the panel to the user's body.

BACKGROUND

Patent Literature 1 recites an electronic device, such as a mobile phone or the like, that transmits air-conducted sound and bone-conducted sound to a user. As the air-conducted sound, Patent Literature 1 recites a sound that is transmitted to the user's auditory nerve by air vibrations, caused by a vibrating object, that are transmitted through the external ear canal to the eardrum and cause the eardrum to vibrate. As human body vibration sound, Patent Literature 1 recites a sound that is transmitted to the user's auditory nerve through a portion of the user's body (such as the cartilage of the outer ear) that is contacting a vibrating object.

Patent Literature 1 recites a telephone in which a rectangular vibrating body, formed from a piezoelectric bimorph and a flexible substance, is attached to an outer surface of a housing via an elastic member. Patent Literature 1 also discloses that when voltage is applied to the piezoelectric bimorph in the vibrating body, the piezoelectric material expands and contracts in the longitudinal direction, causing the vibrating body to undergo bending vibration. Air-conducted sound and human body vibration sound are transmitted to the user when the user contacts the vibrating body to the auricle.

CITATION LIST

Patent Literature 1: JP 2005-348193 A

SUMMARY

The electronic device disclosed in Patent Literature 1 does not take into consideration measures against sound leakage from the outer surface of the housing of the telephone occurring when the housing vibrates due to the vibrating body.

The present invention provides an electronic device that can make it difficult to recognize the content of sound leakage from a vibrating plate that vibrates due to a piezoelectric element.

An electronic device according to the present invention includes a piezoelectric element; a vibrating plate configured to vibrate due to the piezoelectric element, the electronic device causing the vibrating plate to generate air-conducted sound and vibration sound that is transmitted by vibrating a part of a human body; and an air-conducted sound reducing unit configured to make a portion or all of the air-conducted sound difficult to hear.

The air-conducted sound reducing unit may include a speaker that, during playback of the vibration sound, plays back a masking sound differing from the vibration sound.

The air-conducted sound reducing unit may include a speaker that, during playback of the vibration sound, plays back an opposite-phase sound that is opposite in phase to the vibration sound.

The masking sound may include human speech and an animal call.

The masking sound may include sound having a frequency of a predetermined value or greater.

The speaker may be disposed so as to emit sound toward a side opposite a side where the vibrating plate contacts the human body.

A region of the vibrating plate that can contact the human body may have a width equal to or greater than a length from a tragus to an antihelix and a height exceeding a length from the tragus to an inferior antihelix crus in a human ear.

A region of the vibrating plate that can contact the human body may have a width equal to or greater than a length from a tragus to an antihelix and a height exceeding a length from a helix to an earlobe in a human ear.

According to the electronic device of the present invention, the content of sound leakage from the vibrating plate that vibrates due to the piezoelectric element can be made difficult to recognize.

BRIEF DESCRIPTION OF DRAWINGS

The present invention will be further described below with reference to the accompanying drawings, wherein:

FIGS. 3(a) and 3(b) illustrate a housing structure of the electronic device according to Embodiment 1;

DESCRIPTION OF EMBODIMENTS

Figure 1:
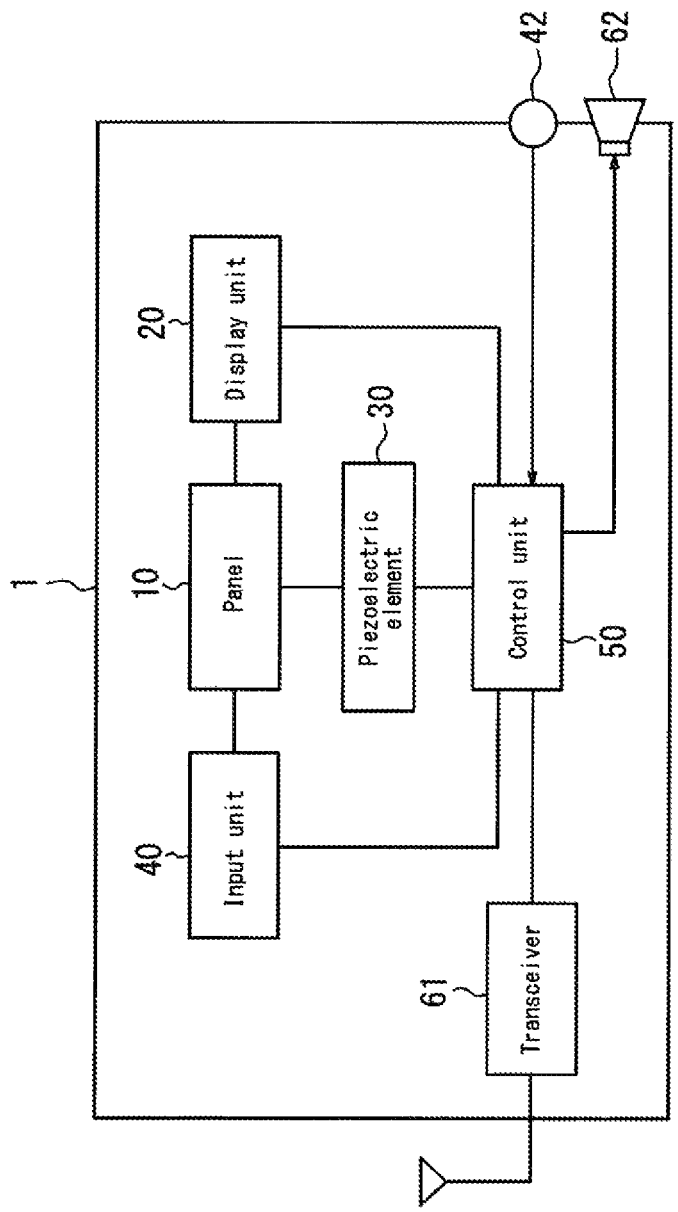
FIG. 1 is a functional block diagram of an electronic device according to an embodiment of the present invention.

Embodiments of the present invention will be described in detail with reference to the accompanying drawings. FIG. 1 is a functional block diagram of an electronic device 1 according to an embodiment of the present invention. The electronic device 1 is, for example, a mobile phone (smartphone) and is provided with a panel 10, a display unit 20, a piezoelectric element 30, an input unit 40, and a control unit 50. Furthermore, the electronic device 1 is provided with a transceiver 61 that communicates wirelessly, a microphone 42 that picks up surrounding sound, and a speaker 62 that is a dynamic receiver.

The panel 10 is a touch panel that detects contact or is a cover panel or the like that protects the display unit 20. The panel 10 functions as a vibrating plate that vibrates due to the piezoelectric element 30. The panel 10 is, for example, made from glass or a synthetic resin such as acrylic or the like. The panel 10 is preferably plate-like in shape. The panel 10 may be a flat plate or may be a curved panel, the surface of which is smoothly inclined. When the panel 10 is a touch panel, the panel 10 detects contact by the user's finger, a pen, a stylus pen, or the like. Any detection system may be used in the touch panel, such as a capacitive system, a resistive film system, a surface acoustic wave system (or an ultrasonic wave system), an infrared system, an electromagnetic induction system, a load detection system, or the like.

The display unit 20 is a display device such as a liquid crystal display, an organic EL display, an inorganic EL display, or the like. The display unit 20 is provided on the back face of the panel 10. The display unit 20 is disposed on the back face of the panel 10 by a joining member (for example, adhesive). The display unit 20 may be adhered to the panel 10 by a joining member (for example, adhesive) or disposed at a distance from the panel 10 and supported by the housing of the electronic device 1.

The piezoelectric element 30 is formed by elements that, upon application of an electric signal (voltage), either expand and contract or bend (flex) in accordance with the electromechanical coupling coefficient of their constituent material. Ceramic or crystal elements, for example, may be used. The piezoelectric element 30 may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage).

The piezoelectric element 30 is disposed on the back face of the panel 10 (the face on the inner side of the electronic device 1). The piezoelectric element 30 is attached to the panel 10 by a joining member (for example, double-sided tape). The piezoelectric element 30 may be attached to the panel 10 with an intermediate member (for example, sheet metal) therebetween. Once disposed on the back face of the panel 10, the piezoelectric element 30 is separated from the inner surface of a housing 60 by a predetermined distance. The piezoelectric element 30 is preferably separated from the inner surface of the housing 60 by the predetermined distance even when expanding and contracting or bending. In other words, the distance between the piezoelectric element 30 and the inner face of the housing 60 is preferably larger than the maximum amount of deformation of the piezoelectric element 30.

The input unit 40 accepts operation input from the user and may be configured, for example, using operation buttons (operation keys). Note that when the panel 10 is a touch panel, the panel 10 can also accept operation input from the user by detecting contact by the user.

The control unit 50 is a processor that controls the electronic device 1. The control unit 50 applies a predetermined electric signal (a voltage corresponding to an audio signal) to the piezoelectric element 30. The voltage that the control unit 50 applies to the piezoelectric element 30 may, for example, be ±15 V. This is higher than ±5 V, i.e. the applied voltage of a so-called panel speaker for conduction of sound by air-conducted sound rather than human body vibration sound. In this way, even if the user presses the panel 10 against the user's body with a force of 3 N or greater (for example, a force of 5 N to 10 N), sufficient vibration is generated in the panel 10, so that a human body vibration sound can be generated via a part of the user's body. Note that the magnitude of the applied voltage used may be appropriately adjusted in accordance with the fixation strength of the panel 10 with respect to the housing or a support member, or in accordance with the performance of the piezoelectric element 30. Upon the control unit 50 applying the electric signal to the piezoelectric element 30, the piezoelectric element 30 expands and contracts or bends in the longitudinal direction. At this point, the panel 10 to which the piezoelectric element 30 is attached deforms in conjunction with the expansion and contraction or bending of the piezoelectric element 30. The panel 10 thus vibrates. The panel 10 flexes due to expansion and contraction or to bending of the piezoelectric element 30. The panel 10 is bent directly by the piezoelectric element 30. Stating that "the panel 10 is bent directly by the piezoelectric element" differs from the phenomenon utilized in known panel speakers, whereby the panel deforms upon vibration of a particular region of the panel due to the inertial force of a piezoelectric actuator constituted by a piezoelectric element disposed in the casing. Stating that "the panel 10 is bent directly by the piezoelectric element" refers instead to how expansion and contraction or bending (flexure) of the piezoelectric element directly bends the panel via the joining member or via the joining member and the below-described reinforcing member 80. Therefore, along with generating air-conducted sound, the panel 10 generates human body vibration sound via a part of the user's body when the user brings a part of the body (such as the cartilage of the outer ear) into contact. For example, the control unit 50 can apply an electric signal, corresponding to an audio signal related to the other party's voice, to the piezoelectric element 30 to generate air-conducted sound and human body vibration sound that correspond to the audio signal. The audio signal may be related to ringtones, music including songs, or the like. Note that the audio signal pertaining to the electric signal may be based on music data stored in internal memory of the electronic device 1, or may be music data stored on an external server or the like and played back over a network.

The panel 10 vibrates not only in the region in which the piezoelectric element 30 is attached, but also in a region separate from the attachment region. In the region of vibration, the panel 10 includes a plurality of locations at which the panel 10 vibrates in a direction intersecting the main surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over nearly the entire panel 10. In other words, a plurality of vibration waves are detected across the entire panel 10. The voltage that the control unit 50 applies to the piezoelectric element 30 may be ±15 V to prevent dampening of the above-described vibration of the panel 10 even if the user presses the panel 10 against the user's body with a force of, for example, 5 N to 10 N. Therefore, the user can hear sound by contacting a region distant from the above-described attachment region of the panel 10 to the ear.

Figure 2:
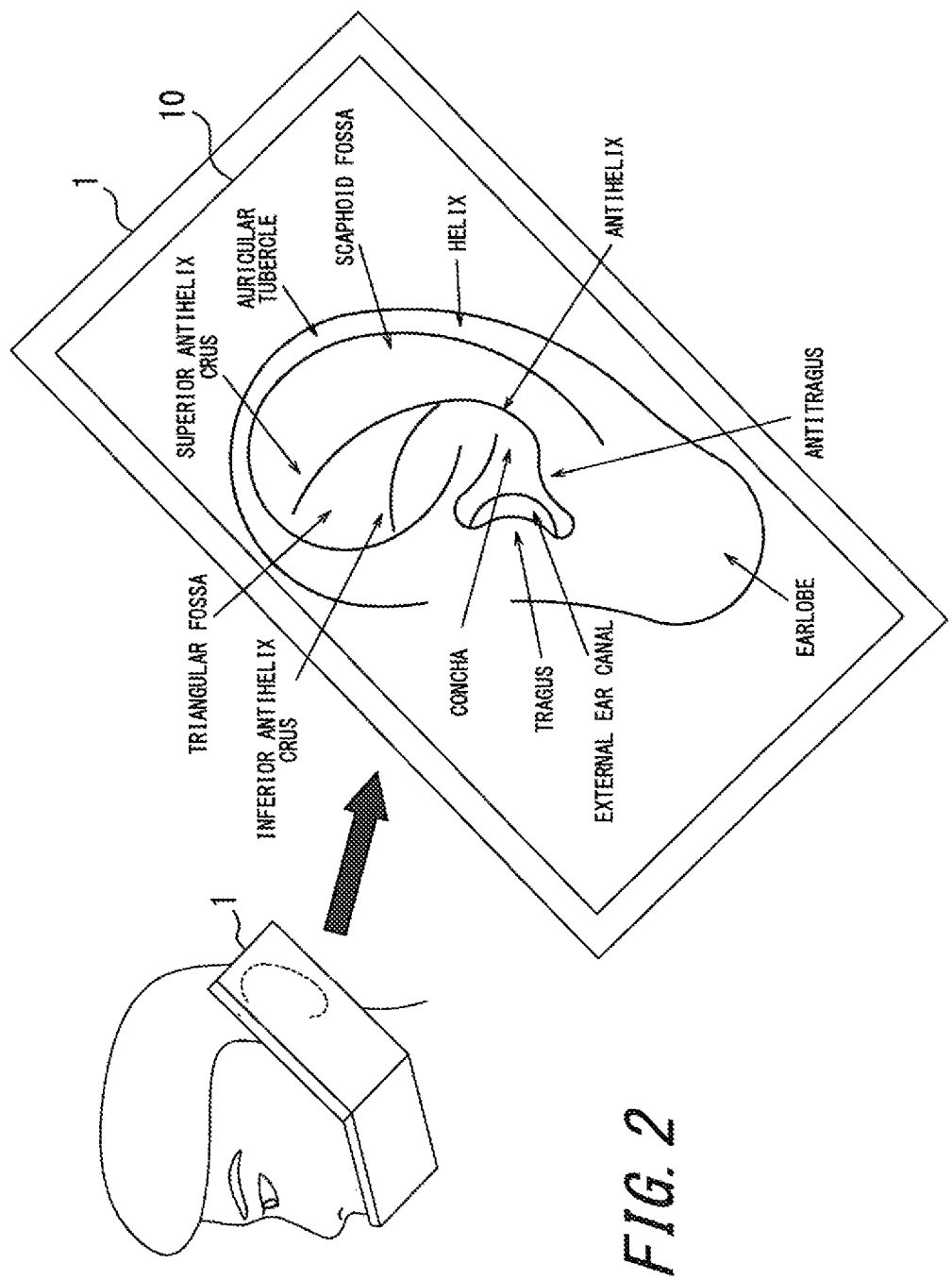
FIG. 2 illustrates an appropriate configuration of a panel.

The panel 10 may be nearly the same size as the user's ear. As illustrated in FIG. 2, the panel 10 may also be larger than the user's ear. Adopting such a size makes it easier for the panel 10 of the electronic device 1 to cover the entire ear when the user listens to sound, thus making it difficult for surrounding sounds (noise) to enter the external ear canal. The region of the panel 10 that vibrates should be larger than a region having a length corresponding to the distance from the inferior antihelix crus to the antitragus and a width corresponding to the distance from the tragus to the antihelix. The region of the panel 10 that vibrates preferably has a length corresponding to the distance from a position in the helix near the superior antihelix crus to the earlobe and a width corresponding to the distance from the tragus to a position in the helix near the antihelix. The region with the above length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 10 is at least as large as the average size of a Japanese person's ear, it is thought that the panel 10 will be a size capable of covering the entire ear of most non-Japanese people.

The speaker 62 is a dynamic receiver, and apart from the vibration sound of the panel 10 that transmits the other party's voice or the like, the speaker 62 sounds a ringtone or the like. The control unit 50 applies a playback signal to the speaker 62. The speaker 62 also functions as an air-conducted sound reducing unit that makes a portion or all of the air-conducted sound difficult to hear. In other words, the speaker 62 generates a sound that makes a portion or all of sound leakage from the panel 10 that vibrates due to the piezoelectric element 30 difficult to hear. In this way, the content of sound leakage from the panel 10 that vibrates due to the piezoelectric element 30 can be made difficult to recognize.

For example, the speaker 62 plays back a masking sound differing from the vibration sound of the panel 10. In this way, the sound leakage from the panel 10 is buried in the masking sound, thereby reducing the clarity of the sound leakage, which can make the content of the sound leakage difficult to recognize. For example, the masking sound may include human speech and animal calls. In this way, the sound leakage from the panel 10 is buried in the human speech or animal call that is the masking sound, thereby making the content of the sound leakage more difficult to recognize. The masking sound may also, for example, include sound having a frequency of a predetermined threshold or greater. In this way, for example when sound leakage of a component having a frequency of a predetermined threshold or greater becomes prominent, the content of the sound leakage can efficiently be made more difficult to recognize in the frequency range in which the sound leakage is prominent. In greater detail, in order to make the content of sound leakage from a voice call difficult to recognize, a sound having a frequency of 2 kHz or greater may be used as the masking sound. The masking sound may also, for example, include sound picked up by the microphone 42. In this way, the sound leakage from the panel 10 is buried in the surrounding noise that is the masking sound, thereby using sound that is natural for the surroundings to make the content of the sound leakage more difficult to recognize.

The speaker 62 may play back an opposite-phase sound that is opposite in phase to the vibration sound of the panel 10. In this case, the control unit 50 applies to the speaker 62 a playback signal for an opposite-phase sound that cancels or reduces the vibration sound (air-conducted sound) generated by vibration of the panel 10. In this way, the sound leakage from the panel 10 is canceled or reduced by the opposite playback sound, making the content of the sound leakage difficult to recognize.

By vibration of the panel 10, the electronic device 1 can transmit human body vibration sound through a part of the user's body (such as the cartilage of the outer ear) and air-conducted sound to the user. Therefore, when sound is output at a volume equivalent to a known dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

The electronic device 1 generates a sound transmitted inside the human body by vibration of the panel 10 caused by the piezoelectric element 30. The sound transmitted inside the human body vibrates the middle ear or the inner ear via soft tissue (such as cartilage) of the human body. The electronic device 1 transmits human body vibration sound by vibration of the panel 10, and therefore even if the user is wearing earphones or headphones, for example, the user can hear sound through the earphones or headphones and through a part of the body by contacting the electronic device 1 against the earphones or headphones.

The electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port should be blocked by a member permeable by air but not liquid. Gore-Tex (registered trademark) is an example of a member permeable by air but not liquid.

Embodiment 1

FIGS. 3(a) and 3(b) illustrate a housing structure of the electronic device 1 according to Embodiment 1. FIG. 3(a) is a front view, and FIG. 3(b) is a cross-sectional view along the b-b line of FIG. 3(a). The electronic device 1 illustrated in FIGS. 3(a) and 3(b) is a smartphone in which a touch panel that is a glass plate is disposed on the front face of the housing 60 (for example a metal or resin case) as the panel 10. The panel 10 and the input unit 40 are supported by the housing 60, and the display unit 20 and piezoelectric element 30 are each adhered to the panel 10 by a joining member 70. The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10, display unit 20, and piezoelectric element 30 are each generally rectangular.

The display unit 20 is disposed in approximately the center in the transverse direction of the panel 10. The piezoelectric element 30 is disposed at a predetermined distance from an edge of the panel 10 in the longitudinal direction, near the edge so that the longitudinal direction of the piezoelectric element 30 is aligned with the short sides of the panel 10. The display unit 20 and the piezoelectric element 30 are disposed side by side, in parallel directions, on the inner face of the panel 10. The speaker 62 is disposed inside the housing 60, and in particular is disposed on the back face side, opposite the panel 10. Note that a waterproofing member may be disposed in the sound discharge port of the speaker 62.

Figure 4:
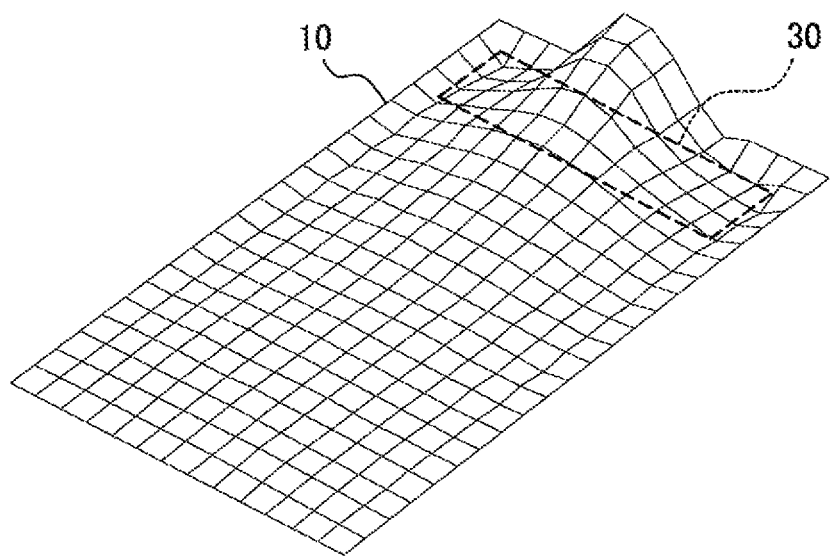
FIG. 4 illustrates an example of vibration of a panel in the electronic device according to Embodiment 1.

FIG. 4 illustrates an example of vibration of the panel 10 in the electronic device 1 according to Embodiment 1. In the electronic device 1 according to Embodiment 1, the display unit 20 is attached to the panel 10. Therefore, it is more difficult for the lower part of the panel 10 to vibrate as compared to the upper part of the panel 10 where the piezoelectric element 30 is attached. As a result, at the lower part of the panel 10, sound leakage due to vibration of the lower part of the panel 10 is reduced. The upper part of the panel 10 is bent directly by the piezoelectric element 30, and hence compared to the upper part, vibration dampens at the lower part. The panel 10 is bent by the piezoelectric element 30 in the direction of the long sides of the piezoelectric element 30 such that the portion of the panel 10 immediately above the piezoelectric element 30 rises the highest as compared to adjacent portions.

In the electronic device 1 according to the present embodiment, the panel 10 thus deforms in conjunction with deformation of the piezoelectric element 30 attached to the back face of the panel 10, so that air-conducted sound and human body vibration sound are transmitted to an object that contacts the deforming panel 10. As a result, air-conducted sound and human body vibration sound can be transmitted to the user without projecting the vibrating body from the outer surface of the housing 60, thereby improving usability over the electronic device disclosed in Patent Literature 1, in which a vibrating body extremely small as compared to the housing is pressed against a human body. The piezoelectric element 30 also does not damage easily, since the user's ear need not be pressed against the piezoelectric element itself. Moreover, causing the housing 60 rather than the panel 10 to deform makes it easier for the user to drop the terminal when vibration is generated, whereas vibrating the panel 10 makes such dropping of the terminal unlikely.

The piezoelectric element 30 is joined to the panel 10 by the joining member 70. The piezoelectric element 30 can thus be attached to the panel 10 in a way that avoids restricting the degree of freedom for deformation of the piezoelectric element 30. The joining member 70 may be a non-heat hardening adhesive. Such adhesive has the advantage that, during hardening, thermal stress contraction does not easily occur between the piezoelectric element 30 and the panel 10. The joining member 70 may also be double-sided tape. Such tape has the advantage that the contraction stress when using adhesive is not easily produced between the piezoelectric element 30 and the panel 10.

The speaker 62 is disposed on the back face side of the housing 60, opposite the panel 10. In other words, the speaker 62 is disposed so as to emit sound towards the side opposite the side where the panel 10, i.e. the vibrating plate, contacts the human body. In this way, the sound for making it difficult to hear a portion or all of sound leakage from the panel 10 that vibrates due to the piezoelectric element 30 can be generated towards the surroundings more efficiently.

Embodiment 2

Figure 5A:
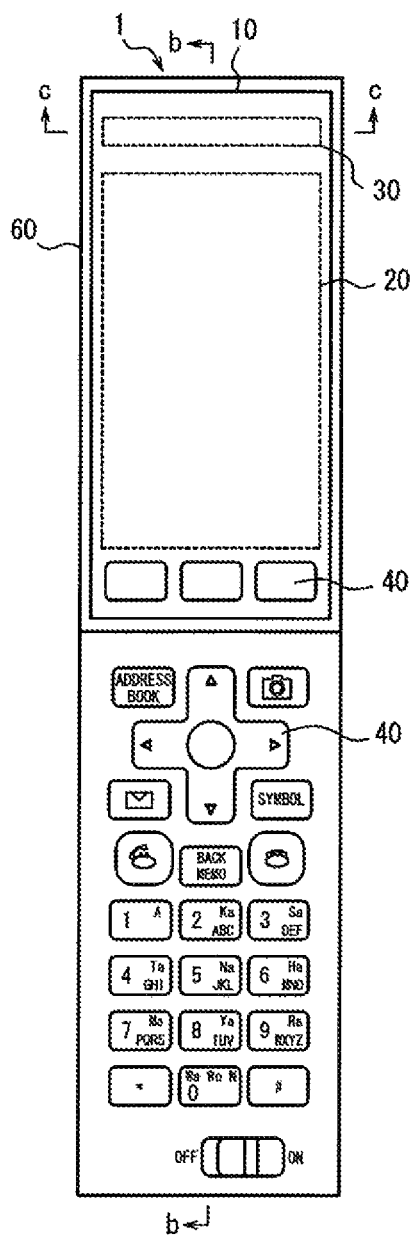
FIGS. 5(a), 5(b), and 5(c) illustrate a housing structure of the electronic device according to Embodiment 2.
Figure 5B:
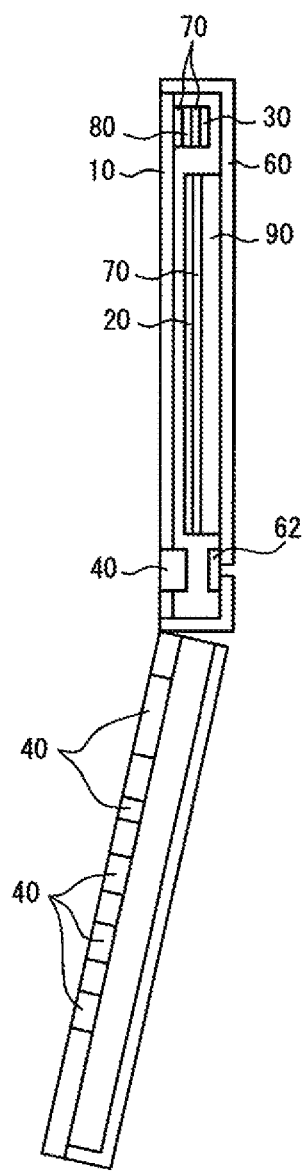
Figure 5C:
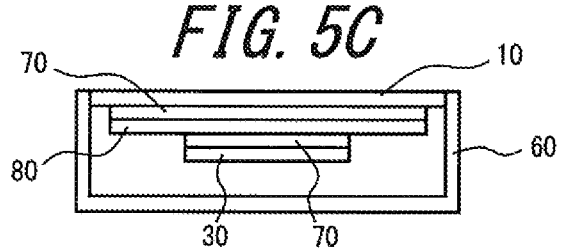

FIGS. 5(a) to 5(c) illustrate a housing structure of the electronic device 1 according to Embodiment 2. FIG. 5(a) is a front view, FIG. 5(b) is a cross-sectional view along the b-b line of FIG. 5(a), and FIG. 5(c) is a cross-sectional view along the c-c line of FIG. 5(a). The electronic device 1 illustrated in FIGS. 5(a) to 5(c) is a clamshell mobile phone in which a cover panel (an acrylic plate) protecting the display unit 20 is disposed on the front face at the upper side of the housing 60 as the panel 10. In Embodiment 2, a reinforcing member 80 is disposed between the panel 10 and the piezoelectric element 30. The reinforcing member 80 is, for example, a resin plate, sheet metal, or a resin plate including glass fiber. In other words, in the electronic device 1 according to Embodiment 2, the piezoelectric element 30 and the reinforcing member 80 are adhered by the joining member 70, and furthermore the reinforcing member 80 and the panel 10 are adhered by the joining member 70. Furthermore, in Embodiment 2, the display unit 20 is not adhered to the panel 10, but rather is supported by the housing 60. In other words, in the electronic device 1 according to Embodiment 2, the display unit 20 is separated from the panel 10 and is joined to a support 90, which is a portion of the housing 60, by the joining member 70. The support 90 is not limited to being a portion of the housing 60 and may be configured using metal, resin, or the like to be a member independent from the housing 60. The speaker 62 is disposed inside the housing 60, and in particular is disposed on the back face side, opposite the panel 10. Note that a waterproofing member may be disposed in the sound discharge port of the speaker 62.

Figure 6:
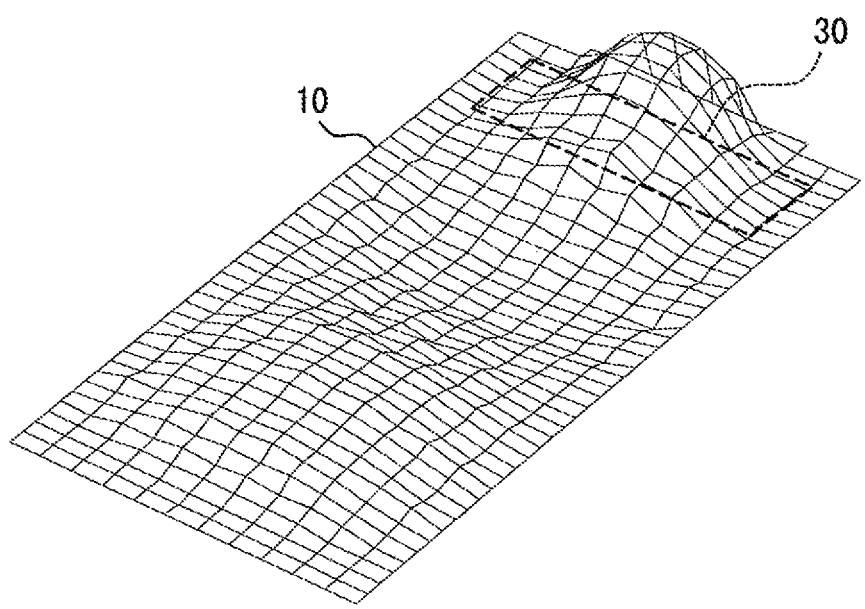
FIG. 6 illustrates an example of vibration of a panel in the electronic device according to Embodiment 2.

FIG. 6 illustrates an example of vibration of the panel 10 in the electronic device 1 according to Embodiment 2. In the electronic device 1 according to Embodiment 2, the panel 10 is an acrylic plate with lower rigidity than a glass plate, and the display unit 20 is not adhered to the back face of the panel 10. Therefore, as compared to the electronic device 1 according to Embodiment 1 illustrated in FIG. 4, the amplitude produced by the piezoelectric element 30 is greater. Moreover, the panel 10 vibrates not only in the region in which the piezoelectric element 30 is attached, but also in a region separate from the attachment region. Therefore, in addition to air-conducted sound, the user can hear human body vibration sound by contacting the ear to any position on the panel 10.

In the electronic device 1 according to the present embodiment, the reinforcing member 80 and the panel 10 deform in conjunction with deformation of the piezoelectric element 30 attached to the panel 10 via the reinforcing member 80, so that air-conducted sound and human body vibration sound are transmitted to an object that contacts the deforming panel 10. As a result, air-conducted sound and human body vibration sound can be transmitted to the user without the user's ear being pressed against the vibrating body itself. Furthermore, the piezoelectric element 30 is attached to the surface of the panel 10 that faces the inside of the housing 60. Air-conducted sound and human body vibration sound can thus be transmitted to the user without projecting the vibrating body from the outer surface of the housing 60. Moreover, the panel 10 deforms not only in the region in which the piezoelectric element 30 is attached, but rather throughout the panel 10 in order to transmit air-conducted sound and human body vibration sound. Therefore, in addition to air-conducted sound, the user can hear human body vibration sound by contacting the ear to any position on the panel 10.

Disposing the reinforcing member 80 between the piezoelectric element 30 and the panel 10 can reduce the probability of an external force being transmitted to and damaging the piezoelectric element 30 if, for example, such a force is applied to the panel 10. Moreover, even if the panel 10 is pressed firmly against a human body, vibrations of the panel 10 do not dampen easily. By disposing the reinforcing member 80 between the piezoelectric element 30 and the panel 10, the resonance frequency of the panel 10 also decreases, thereby improving the acoustic characteristics in the low frequency band. Note that instead of the reinforcing member 80, a plate-shaped anchor may be attached to the piezoelectric element 30 by the joining member 70.

The speaker 62 is disposed on the back face side of the housing 60, opposite the panel 10. In other words, the speaker 62 is disposed so as to emit sound towards the side opposite the side where the panel 10, i.e. the vibrating plate, contacts the human body. In this way, the sound for making it difficult to hear a portion or all of sound leakage from the panel 10 that vibrates due to the piezoelectric element 30 can be generated towards the surroundings more efficiently.

Although the present invention has been described by way of embodiments with reference to the accompanying drawings, it is to be noted that various changes and modifications will be apparent to those skilled in the art based on the present disclosure. Therefore, such changes and modifications are to be understood as included within the scope of the present invention. For example, the functions and the like included in the various members and steps may be reordered in any logically consistent way. Furthermore, components or steps may be combined into one or divided.

Figure 7:
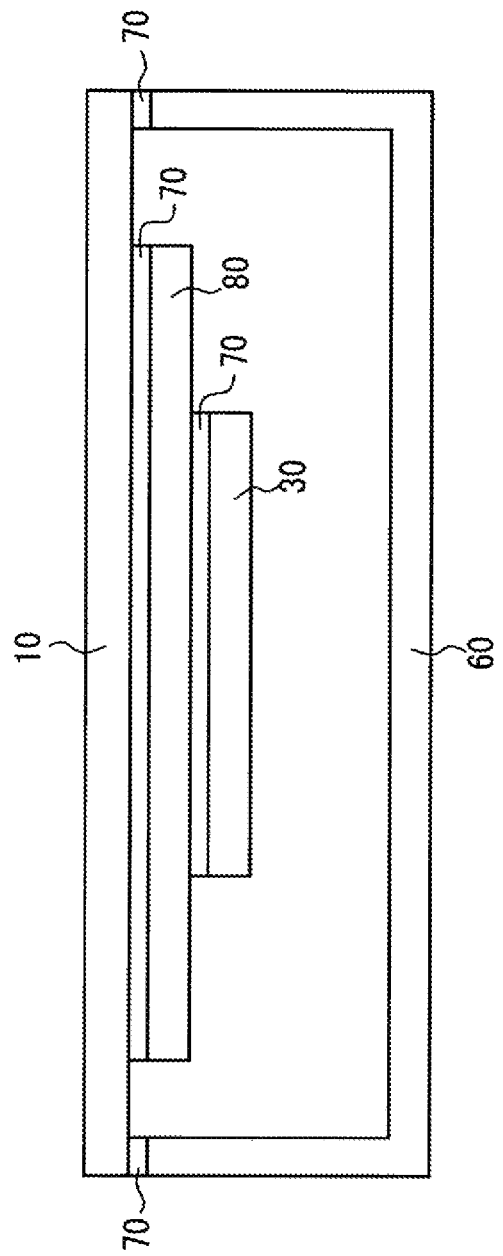
FIG. 7 illustrates an example of joining the panel and the housing.

For example, as illustrated in FIG. 7, the panel 10 may be joined to the housing 60 by the joining member 70. Making it difficult for vibration to be transmitted directly from the panel 10 to the housing 60 in this way reduces the risk of the user dropping the electronic device 1 as compared to when the housing itself vibrates significantly. The joining member 70 may be a non-heat hardening adhesive. Such adhesive has the advantage that, during hardening, thermal stress contraction does not easily occur between the housing 60 and the panel 10. The joining member 70 may also be double-sided tape. Such tape has the advantage that the contraction stress when using adhesive is not easily produced between the housing 60 and the panel 10.

For example, when the panel 10 and the display unit 20 do not overlap, the piezoelectric element 30 may be disposed at the center of the panel 10. When the piezoelectric element 30 is disposed at the center of the panel 10, vibration of the piezoelectric element 30 is transmitted uniformly across the entire panel 10, thereby improving quality of air-conducted sound and permitting recognition of human body vibration sound when the user contacts the ear to any of various positions on the panel 10. As in the above-described embodiment, a plurality of piezoelectric elements 30 may also be provided.

The piezoelectric element 30 is attached to the panel 10 in the above electronic device 1 but instead may be attached to a location other than the panel 10. For example, the piezoelectric element 30 may be attached to a battery lid that is attached to the housing 60 and covers a battery. Since the battery lid is often attached to a different face than the panel 10 in the electronic device 1 that is a mobile phone or the like, according to this structure the user can hear sound by contacting a part of the body (such as the ear) to a different face than the panel 10.

Furthermore, the panel 10 may constitute a portion or the entirety of any of a display panel, an operation panel, a cover panel, or a lid panel that allows for removal of a rechargeable battery. In particular, when the panel 10 is a display panel, the piezoelectric element 30 is disposed on the outside of a display region fulfilling a display function. This offers the advantage of not blocking the display. The operation panel includes the touch panel of Embodiment 1. The operation panel also includes a sheet key, in which the tops of operation keys are integrally formed in, for example, a clamshell mobile phone so as to constitute one face of the housing alongside an operation unit.

Note that in Embodiments 1 and 2, the joining member that adheres the panel 10 and the piezoelectric element 30, the joining member that adheres the panel 10 and the housing 60, and the like have been described as the joining member 70, using the same reference numeral. The joining members used in Embodiments 1 and 2, however, may differ as needed in accordance with the components being joined.

The region, of the panel 10 of Embodiment 1 and Embodiment 2, that can contact the human body may have a width equal to or greater than the length from the tragus to the antihelix and a height exceeding the length from the tragus to the inferior antihelix crus in a human ear. Adopting such a size makes it easier for the panel 10 of the electronic device 1 to cover the entire ear when the user listens to sound, thus making it difficult for surrounding sounds (noise) to enter the external ear canal. The sound played back by the speaker 62, such as the masking sound, opposite-phase sound, or the like, for making it difficult to hear a portion or all of the vibration sound of the panel 10 can also be obstructed from entering the external ear canal.

The region, of the panel 10 of Embodiment 1 and Embodiment 2, that can contact the human body may have a width equal to or greater than the length from the tragus to the antihelix and a height exceeding the length from the helix to the earlobe in a human ear. Adopting such a size makes it easier for the panel 10 of the electronic device 1 to cover the entire ear when the user listens to sound, thus making it difficult for surrounding sounds (noise) to enter the external ear canal. The sound played back by the speaker 62, such as the masking sound, opposite-phase sound, or the like, for making it difficult to hear a portion or all of the vibration sound of the panel 10 can also be obstructed from entering the external ear canal.

REFERENCE SIGNS LIST

1: Electronic device
10: Panel (vibrating plate)
20: Display unit
30: Piezoelectric element
40: Input unit
50: Control unit
42: Microphone
61: Transceiver
62: Speaker (air-conducted sound reducing unit)
60: Housing
70: Joining member
80: Reinforcing member

The invention claimed is:

1. An electronic device comprising:
a piezoelectric element;
a vibrating plate configured to vibrate due to the piezoelectric element, the electronic device causing the vibrating plate to generate air-conducted sound and vibration sound that is transmitted by vibrating a part of a human body; and
an air-conducted sound reducing unit configured to make a portion or all of the air-conducted sound difficult to hear,
wherein the piezoelectric element is shaped to have a longitudinal direction and
wherein the vibrating plate is bent by the piezoelectric element so that an area of the vibrating plate above the piezoelectric element protrudes higher than other areas of the vibrating plate in the longitudinal direction of the piezoelectric element to vibrate a contact position of the human body contacting the vibrating plate.

2. The electronic device according to claim 1, wherein the air-conducted sound reducing unit includes a speaker that, during playback of the vibration sound, plays back a masking sound differing from the vibration sound.

3. The electronic device according to claim 1, wherein the air-conducted sound reducing unit includes a speaker that, during playback of the vibration sound, plays back an opposite-phase sound that is opposite in phase to the vibration sound.

4. The electronic device according to claim 2, wherein the masking sound includes human speech and an animal call.

5. The electronic device according to claim 2, wherein the masking sound includes sound having a frequency of a predetermined value or greater.

6. The electronic device according to claim 2, wherein the speaker is disposed so as to emit sound toward a side opposite a side where the vibrating plate contacts the human body.

7. The electronic device according to claim 1, wherein a region of the vibrating plate that can contact the human body has a width equal to or greater than a length from a tragus to an antihelix and a height exceeding a length from the tragus to an inferior antihelix crus in a human ear.

8. The electronic device according to claim 1, wherein a region of the vibrating plate that can contact the human body has a width equal to or greater than a length from a tragus to an antihelix and a height exceeding a length from a helix to an earlobe in a human ear.

9. An electronic device comprising:
a piezoelectric element;
a vibrating plate configured to vibrate due to the piezoelectric element, the electronic device causing the vibrating plate to generate air-conducted sound and vibration sound that is transmitted by vibrating a part of a human body; and
a speaker that, during playback of the vibration sound, plays back a masking sound differing from the vibration sound,
wherein the piezoelectric element is shaped to have a longitudinal direction and
wherein the vibrating plate is bent by the piezoelectric element so that an area of the vibrating plate above the piezoelectric element protrudes higher than other areas of the vibrating plate in the longitudinal direction of the piezoelectric element to vibrate a contact position of the human body contacting the vibrating plate.

10. An electronic device comprising:
a piezoelectric element;
a vibrating plate configured to vibrate due to the piezoelectric element, the electronic device causing the vibrating plate to generate air-conducted sound and vibration sound that is transmitted by vibrating a part of a human body; and
a speaker that, during playback of the vibration sound, plays back an opposite-phase sound that is opposite in phase to the vibration sound,
wherein the piezoelectric element is shaped to have a longitudinal direction and
wherein the vibrating plate is bent by the piezoelectric element so that an area of the vibrating plate above the piezoelectric element protrudes higher than other areas of the vibrating plate in the longitudinal direction of the piezoelectric element to vibrate a contact position of the human body contacting the vibrating plate.

* * * * *